United States Patent [19]
Biersteker et al.

[11] Patent Number: 5,896,779
[45] Date of Patent: Apr. 27, 1999

[54] DUAL MODE BRAKE ACTUATOR FOR WALKER

[75] Inventors: Melvin C. Biersteker, Santa Barbara; Alfredo R. Nuno, Simi Valley, both of Calif.

[73] Assignee: Sunrise Medical HHG Inc., Longmont, Colo.

[21] Appl. No.: 08/904,998

[22] Filed: Aug. 1, 1997

[51] Int. Cl.[6] .................................................. F16C 1/12
[52] U.S. Cl. .......................................... 74/502.2; 74/489
[58] Field of Search .................................. 74/502.2, 502, 74/501.6, 489, 488

[56] References Cited

U.S. PATENT DOCUMENTS

| | | |
|---|---|---|
| D. 329,833 | 9/1992 | Andersson et al. ............... D12/130 |
| D. 344,917 | 3/1994 | Kjell et al. ........................ D12/130 |
| 735,113 | 8/1903 | Kelland et al. . |
| 3,176,536 | 4/1965 | Altenburger ....................... 74/489 |
| 3,800,618 | 4/1974 | Yoshigai ............................. 74/489 |
| 3,948,361 | 4/1976 | Carlson .............................. 188/24 |
| 4,653,613 | 3/1987 | Blancas .............................. 188/24 |
| 4,667,785 | 5/1987 | Toyoda et al. ..................... 192/13 |
| 4,785,683 | 11/1988 | Buckley et al. .................... 74/489 |
| 4,899,610 | 2/1990 | Bourret ............................... 74/489 |
| 4,907,794 | 3/1990 | Rose .................................. 272/70.3 |
| 5,078,023 | 1/1992 | Scarborough ..................... 74/502.2 |
| 5,172,715 | 12/1992 | Webb ................................. 135/67 |
| 5,279,180 | 1/1994 | Henriksson ....................... 74/502.2 |
| 5,287,765 | 2/1994 | Scura ................................. 74/502.2 |
| 5,664,460 | 9/1997 | Hewson ............................. 74/502.2 |

*Primary Examiner*—John A. Jeffery
*Assistant Examiner*—MaryAnn Battista
*Attorney, Agent, or Firm*—MacMillan, Sobanski & Todd, LLC

[57] ABSTRACT

A manually operated brake actuator for a wheeled walker and the like. For normal braking, a handle is manually moved from a neutral first position towards a second position for rotating a cable link to progressively pull on a brake cable to engage a wheel brake. When the handle is released, it returns to the first position. When the handle is manually moved from the first position to a third position, a parking link is rotated to push on and rotate the cable link to engage the brake. The parking link is rotated to a stable position when the handle is in the third position, wherein pull on the brake cable cannot release the brake until the handle is manually moved back to the first position.

16 Claims, 7 Drawing Sheets

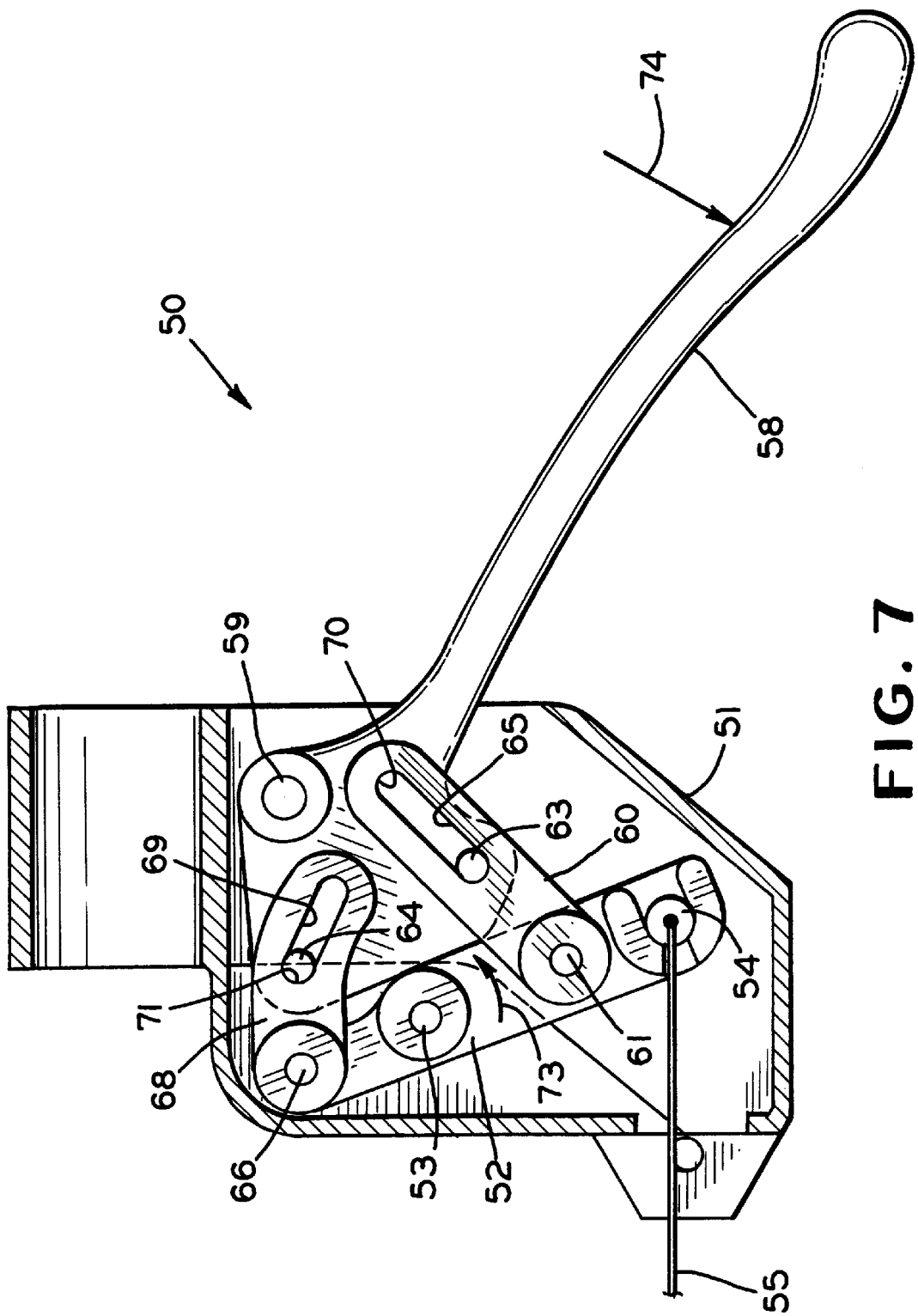

DUAL MODE BRAKE ACTUATOR FOR WALKER

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

Walkers are commonly used by the elderly, the infirm and patients recovering from injuries and surgery for providing stability in walking. One type of walker is provided with wheels. For safety reasons, it is desirable to provide a hand operated wheel brake for wheeled walkers. A brake actuator includes a handle which, when squeezed, pulls on a cable to operate the brake. In some situations, it is desirable to provide two brake operating modes for a wheeled walker. In one type of known walker brake actuator, such as is shown in U.S. Pat. No. 5,279,180, the brake cable is progressively pulled to apply the brake as the handle is progressively squeezed towards a hand grip region on the walker. If the handle is pushed away from the hand grip, the cable is pulled until an abutment on the handle engages a housing abutment to lock the brake in an actuated position. Locking the brake can, for example, provide stability while the user is sitting down or is arising from a seated position. In some cases, a wheeled walker also is provided with a seat platform. It can be desirable to lock a wheel brake while a user is seated on the walker to prevent unintended rolling.

In addition to wheeled walkers, it is known that hand operated brakes in various types of vehicles such as bicycles, motorcycles and snowmobiles may be provided with a locked or park position. Exemplary hand operated brake actuators which include a locked position are shown, for example, in U.S. Pat. Nos. 735,113, 3,948,361 and 4,653,613.

BRIEF SUMMARY OF THE INVENTION

The invention is directed to a hand operated brake actuator which has two operating modes: a braking mode and a parking mode. As a handle is progressively moved from a first or neutral position to a second position in the braking mode, a cable link is pivoted to progressively pull on a brake cable to progressively engage a brake. When the handle is released, tension on the brake cable returns the handle to the first position and the brake is released. In the parking mode, as the handle is moved from the first position to a third position, the cable link is pivoted by a parking link to engage the brake and the cable link is held in this position by the parking link. The handle will remain in the third position with the brake engaged until it is manually moved towards the first position to release the locking link.

Accordingly, it is an object of the invention to provide a hand operated brake actuator suitable for use with wheeled walkers and with other vehicles.

Another object of the invention is to provide a hand operated brake actuator which has both a braking mode for progressively engaging the brake and a parking mode for locking the brake in an engaged position.

Other objects and advantages of the invention will become apparent from the following detailed description of the invention and the accompanying drawings.

BRIEF DESCRIPTION OF THE DRAWINGS

FIG. 7 is a side elevational view, in partial section, of the brake actuator of FIG. 5 only shown in the locked or park position.

DETAILED DESCRIPTION OF THE INVENTION

Figure 1:
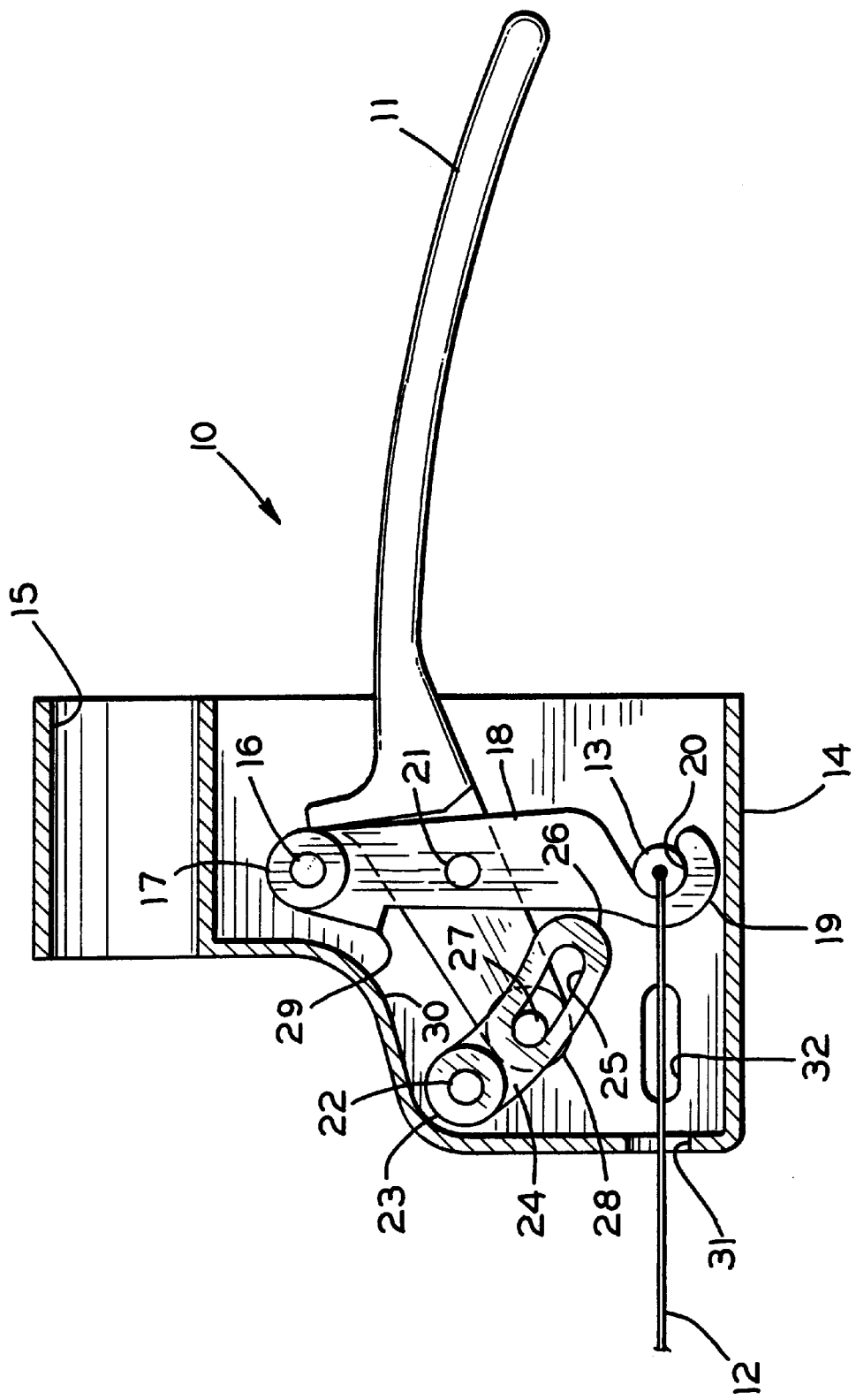
FIG. 1 is a side elevational view, in partial section, of a brake actuator according to the invention shown in the neutral or released position.
Figure 2:
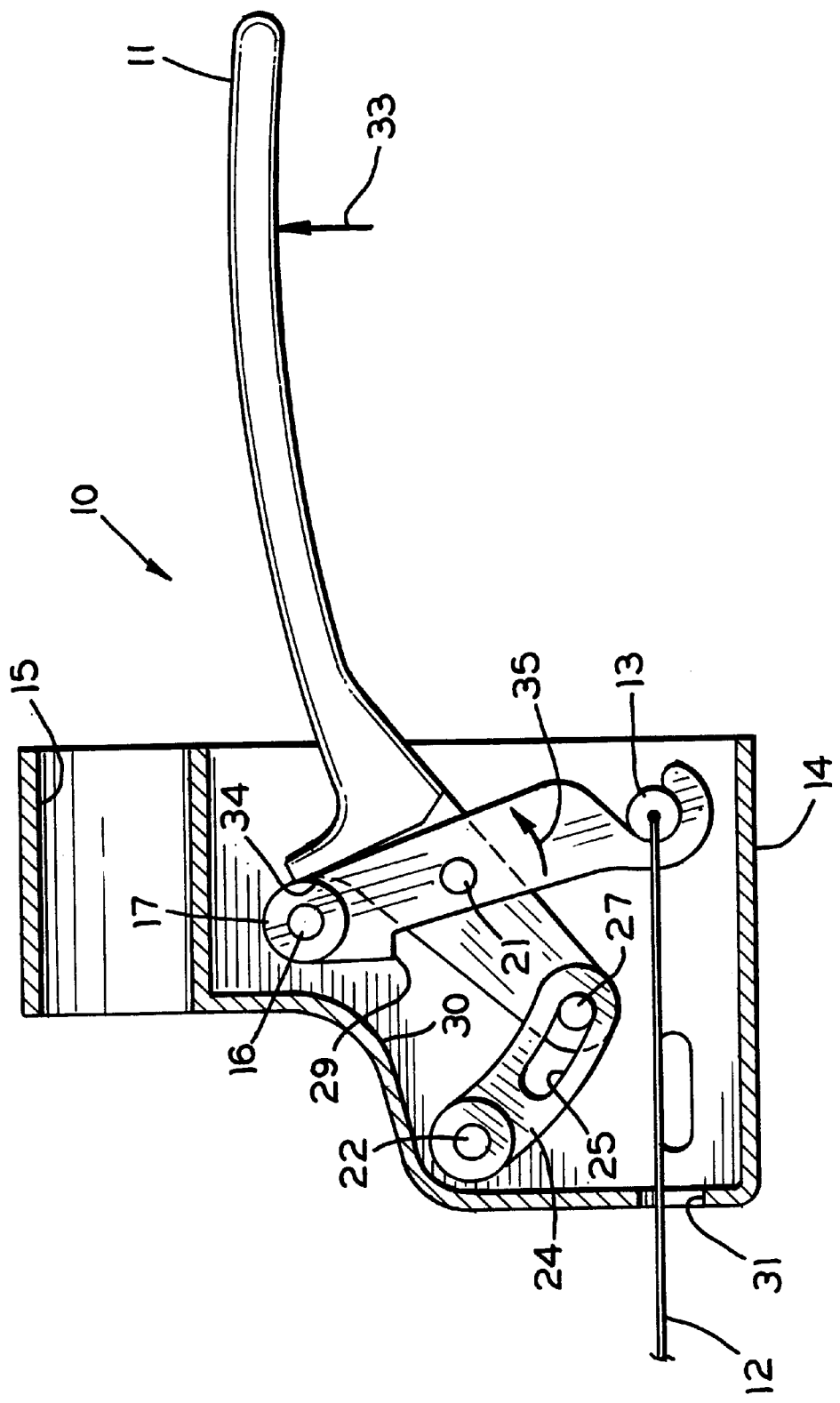
FIG. 2 is a side elevational view, in partial section, of the brake actuator of FIG. 1 only shown in the slow down position.
Figure 3:
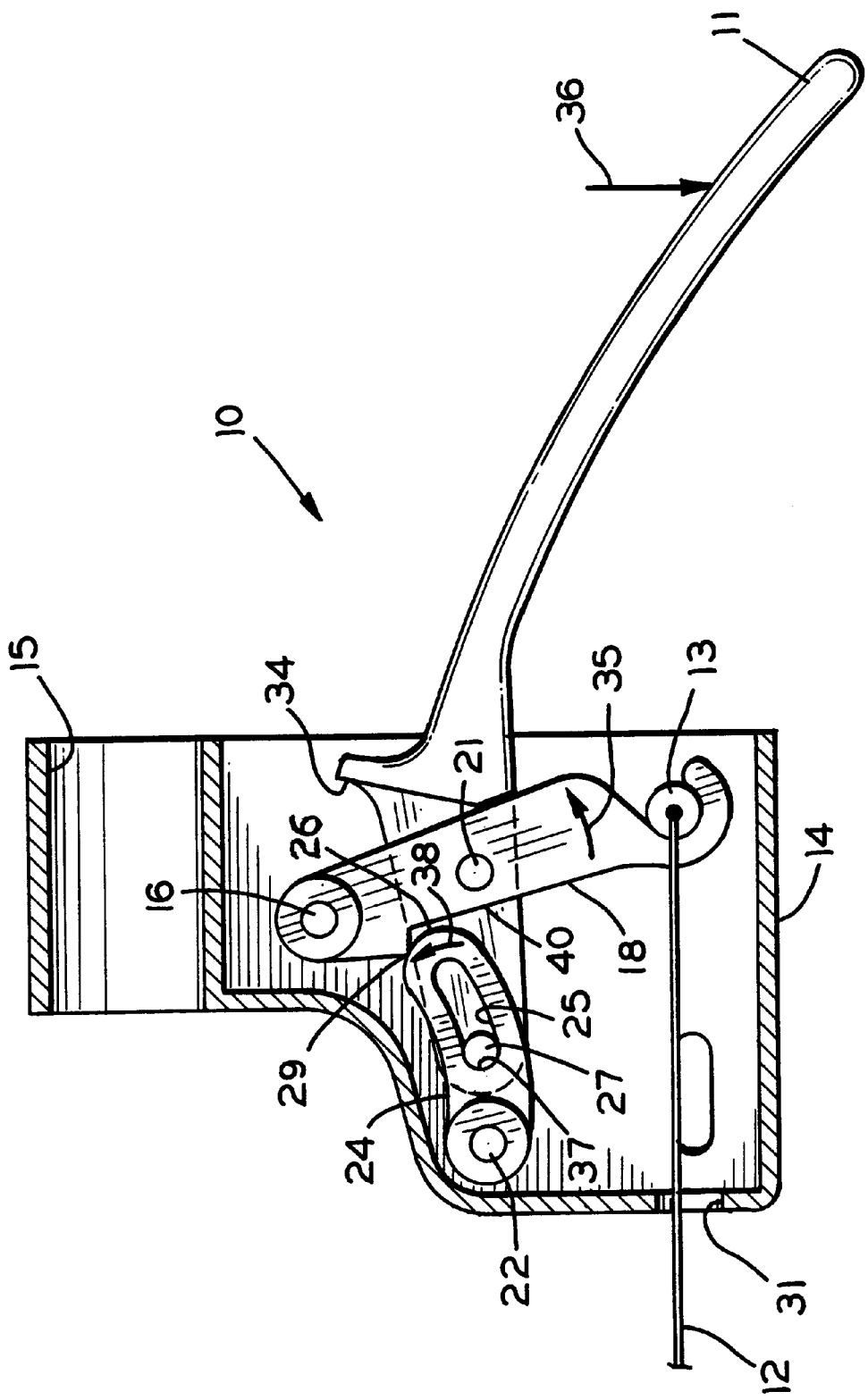
FIG. 3 is a side elevational view, in partial section, of the brake actuator of FIG. 1 only shown in the locked or park position.

Referring first to FIGS. 1–3 of the drawings, a brake actuator 10 is illustrated according to a first preferred embodiment of the invention. The brake actuator 10 has a handle 11 which can be manually manipulated either to progressively apply a brake in a first operating mode or to engage the brake in a locked or parked position in a second operating mode. The brake actuator 10 is particularly suitable for use with wheeled walkers, but also may be adapted for use with other types of vehicles which have hand operated brakes such as bicycles, motorcycles and snowmobiles.

The brake actuator 10 operates a brake of conventional design by pulling on a cable 12 to engage the brake (not shown) and releasing the cable to disengage the brake. The brake includes a spring (not shown) which urges the brake and the brake cable 12 to the disengaged position. Typically, the brake cable 12 has a cylindrical end terminal 13 for engagement by the brake actuator 10. Exemplary wheeled walkers with brake actuators which pull on a brake cable to engage a brake are illustrated, for example, in U.S. Pat. Nos. 4,907,794 and 5,172,715 and U.S. design Pat. Nos. D329,833 and D344,917. When a brake actuator is moved to pull the brake cable against the force of a release spring, a bar or pad is moved into engagement with the perimeter of a wheel to prevent rotation of the wheel. When the brake actuator is released, the release spring moves the bar away from contact with the wheel so that the wheel is free to rotate. It will be appreciated that the brake actuator 10 may be used with other types of brakes, such as caliper brakes having brake pads which engage a wheel rim. The invention is directed to a brake actuator and is not limited to a specific brake design.

The brake actuator 10 includes a housing 14 which has an opening 15 adapted to clamp on a frame or rail (not shown) on the walker in a conventional manner for mounting the brake actuator 10. The housing 14 includes a pivot 16 on which an end 17 of a cable link 18 is mounted to rotate. An opposite end 19 of the cable link 18 has a cupped or hooked section 20 which engages the cable end terminal 13. The brake handle 11 is mounted to rotate on a pivot 21 on the cable link 18. The pivot 21 is located on the cable link 18 at a point intermediate the ends 17 and 19. The housing 14 also has a pivot 22. One end 23 of a parking link 24 is mounted on the pivot 22 to permit the parking link 24 to rotate. The parking link 24 has an elongated slot 25 extending to adjacent an end 26 opposite the end 23. The slot 25 extends in a direction generally radially from the pivot 22, but may have a slightly curved or arcuate shape. A pin 27 on an end 28 of the handle 11 in the housing 14 is positioned in the slot 25. Finally, a stop 29 is provided to limit rotation of the parking link 24. The stop 29 may be formed on the cable link 18, as shown, or as a separate element attached to the housing 14, or a side wall 30 of the housing 14 may serve as the stop.

FIG. 1 of the drawings shows the brake actuator 10 in the neutral or released position. A release spring (not shown) for the brakes (not shown) pulls on the cable 12 to position the handle 11 and the links 18 and 24 as shown. Although not illustrated, a conventional adjustment fitting may engage a brake cable opening 31 or a slot 32 in the housing for adjusting the brake so that it is properly engaged when the handle 11 is moved.

FIG. 2 shows normal application of the brakes as the handle 11 is moved in the direction of an arrow 33. The handle 11 is moved towards a portion of a walker which is grasped by a user. As the handle 11 is progressively moved, the brake will be progressively engaged to stop rolling of the walker. During movement of the handle 11 in the direction of the arrow 33, an abutment 34 on the handle 11 engages the cable link 18 adjacent the end 17. Consequently, movement of the handle 11 pulls on the handle pivot 21 to cause the cable link 18 to rotate in the direction of an arrow 35 to pull on the brake cable 12, thus engaging the brake. The degree to which the brake is engaged will be proportional to the degree of movement of the handle 11 in the direction of the arrow 33. When the user releases the handle 11, the spring tension on the brake cable 12 causes the handle 11 to return to the neutral position shown in FIG. 1. It will be noted that the pin 27 is free to move in the slot 25 in the parking link 24 as the brake is engaged and released. In the normal braking mode, the slot 25 functions to permit the brake handle and the cable link 18 to rotate together about the cable pivot 16 without interference by the parking link 24.

In addition to the normal braking mode as shown in FIG. 2, the actuator may be placed in a parking mode to constantly engage the brake. In order to engage the parking mode, the handle 11 is moved from the neutral position in FIG. 1 in the direction of the arrow 36, as shown in FIG. 3. As the handle 11 is moved, it rotates on the pivot 21. At the same time, the pin 27 moves in the parking link slot 25 until it abuts an end 37 of the slot 25. The slot end 37 is the end of the slot 25 nearest to the parking link pivot 22. Once the pin 27 contacts the slot end 37, the pin 27 is prevented from further movement towards the parking link pivot 22. When the handle 11 is rotated further about the pivot 21, the pin 27 rotates the parking link 24 in the direction of an arrow 38 until the parking link 24 abuts the stop 29. As the parking link 24 is rotated in the direction of the arrow 38, it pushes on the pin 27 on the handle 11 to cause the cable link 18 to rotate in the direction of the arrow 35, away from the parking link pivot 22. Alternately, as the parking link 24 is rotated in the direction of the arrow 38, the end 26 of the parking link 24 may engage an edge 40 of the cable link 18 to push on and rotate the cable link 18 in the direction of the arrow 35. As the cable link 18 is thus rotated, the cable 12 is pulled to engage the brake. When the parking link 24 is abutting the stop 29 as shown in FIG. 3, the brake is fully engaged. When the parking link 24 abuts the stop 29, it has been rotated either to or, preferably, slightly over center past a line extending from the parking link pivot 22 to the handle pivot 21 on the cable link 18. Consequently, the brake cannot be disengaged by the pull on the cable 12 when the user's hand is removed from the handle 11.

Figure 4:
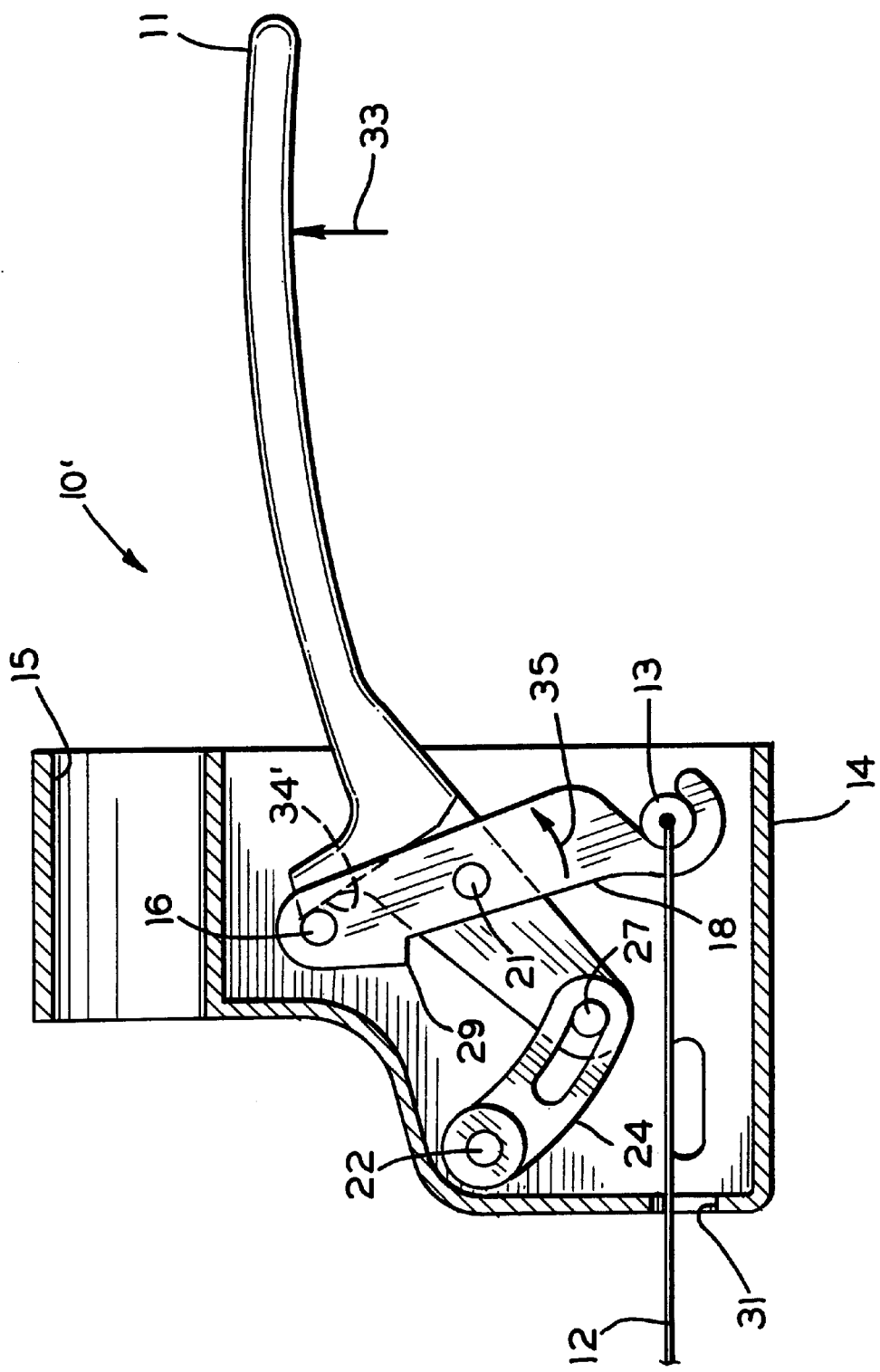
FIG. 4 is a side elevational view, in partial section, of a modified embodiment of the brake actuator of FIG. 1 shown in the slow down position.

FIG. 4 shows a slightly modified brake actuator 10'. The brake actuator 10' is identical to the brake actuator 10, except that the abutment 34 on the handle 11 has been replaced with a modified abutment 34' which engages the pivot 16 rather than the cable link 18. Otherwise, the brake actuator 10' of FIG. 4 functions identical to the brake actuator 10 of FIGS. 1–3.

Figure 5:
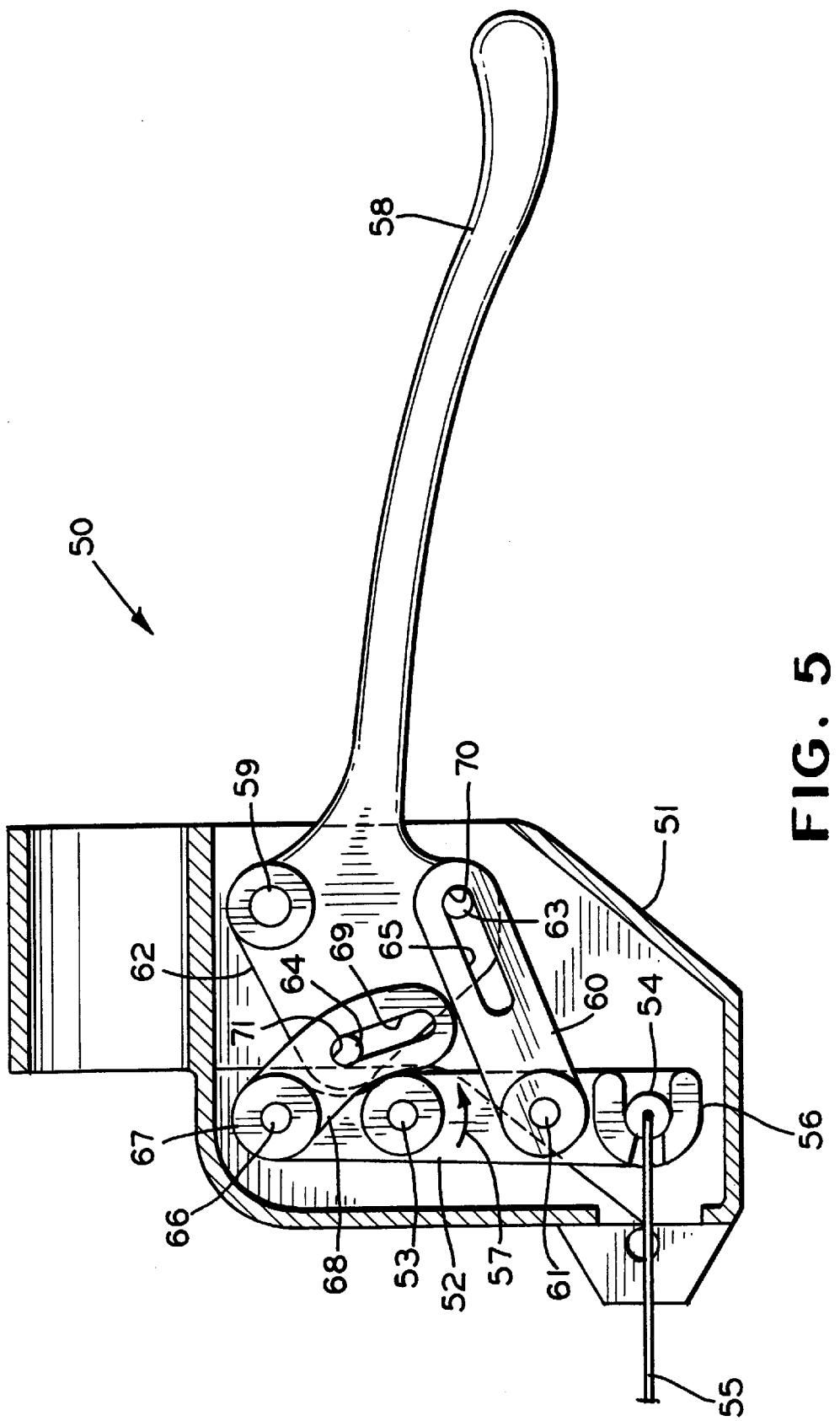
FIG. 5 is a side elevational view, in partial section, of a brake actuator according to a further modified embodiment of the invention shown in the neutral or released position.
Figure 6:
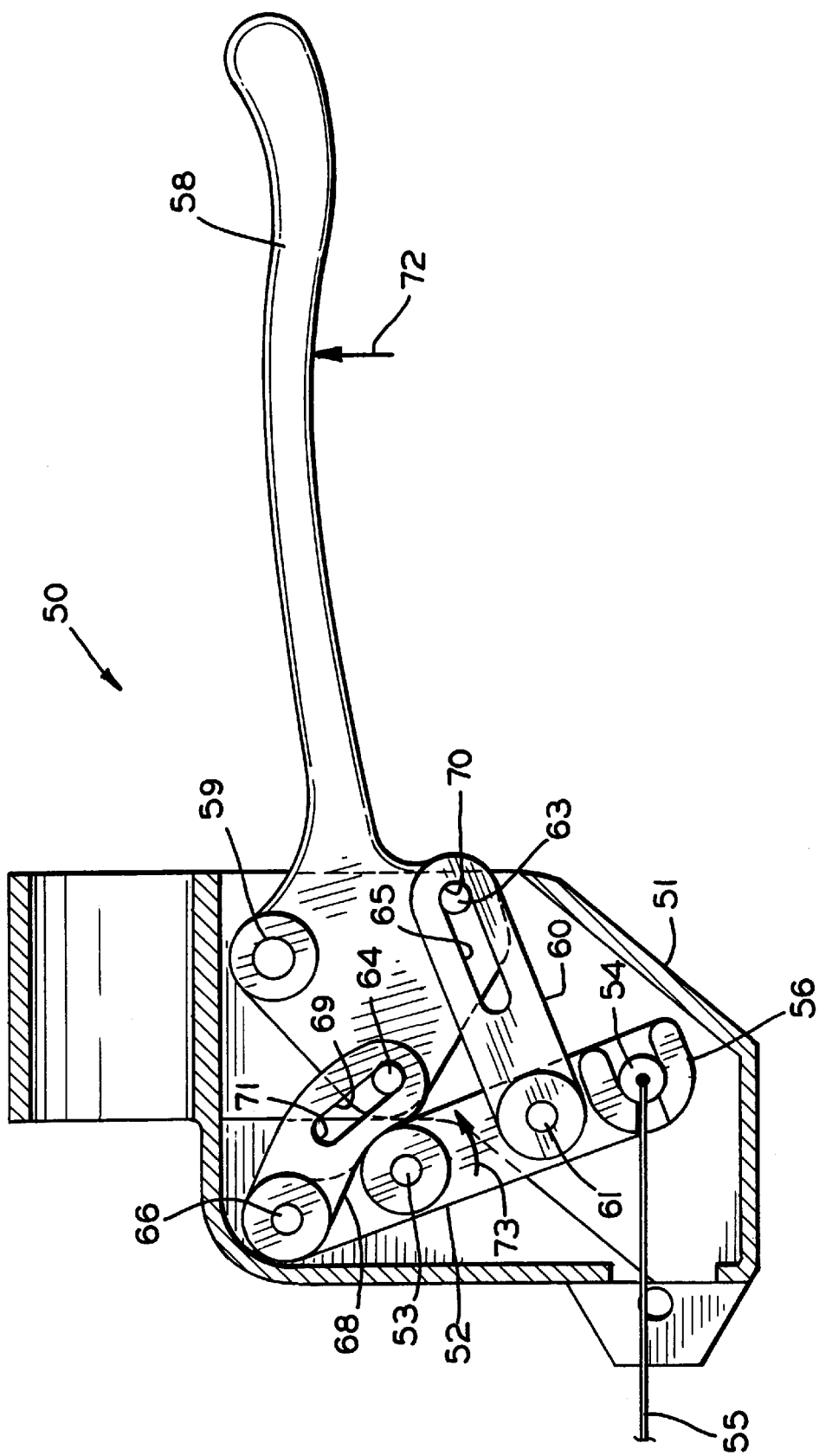
FIG. 6 is a side elevational view, in partial section, of the brake actuator of FIG. 5 only shown in the slow down position.

FIGS. 5–7 illustrate a further embodiment of a brake actuator 50 according to the invention. The brake actuator 50 includes a housing 51 in which a cable link 52 is mounted to rotate on a cable link pivot 53 on the housing 51. A terminal 54 on an end of a brake cable 55 is attached to the cable link 52 adjacent an end 56. As the cable link 52 is rotated in the direction of an arrow 57, the cable 55 is pulled to engage the brakes on a wheeled walker or other wheeled vehicle. FIG. 5 shows the brake actuator 50 in the neutral position wherein the cable 55 is not pulled to engage the brake.

A handle 58 is mounted to rotate on a pivot 59 on the housing 51. A braking link 60 is mounted to rotate on a braking link pivot 61 on the cable link 52. The pivot 61 is located on the cable link 52 between the pivot 53 and the cable link end 56. The handle 58 has an end section 62 adjacent the pivot 59 on which two pins 63 and 64 are mounted. The pins 63 and 64 rotate about the pivot 59 with the handle 58. The pin 63 is located in a slot 65 which extends in the braking link 60 in a radial direction away from the pivot 61. A parking link pivot 66 is mounted on an end 67 of the cable link 52 opposite the end 56. A parking link 68 is mounted to rotate on the pivot 66. The parking link 68 includes a slot 69 which receives the pin 64 on the handle end section 62. When the brake is in the neutral or disengaged position as shown in FIG. 5, the pin 63 engages an end 70 of the braking link slot 65 and the pin 64 engages an end 71 of the parking link slot 69.

In order to engage the brake to slow down or stop rotation of a wheel, the handle 58 is moved in the direction of an arrow 72, as shown in FIG. 6. As the handle 58 is moved in the direction of the arrow 72, the pin 63 pulls on the end 70 of the braking link 60 to rotate the cable link 52 in the direction of an arrow 73, pulling on the brake cable 55. At the same time, the pin 64 is free to move in the parking link slot 69 away from the end 71. Consequently, the parking link 68 does not interfere with rotation of the cable link 52 for normal braking. The amount of pull on the brake cable 55 will be proportional to the movement of the handle 72.

FIG. 7 shows the brake actuator 50 in the parking mode with the brake cable 55 pulled to constantly engage the brake. For the parking mode, the handle 58 is moved in the direction of an arrow 74. As the handle 58 is moved in the direction of the arrow 74, the handle 58 rotates about the pivot 59. The pin 63 moves in the braking link slot 65 away from the slot end 70 and the braking link 60 is free to rotate without exerting any force on the cable link 52. At the same time, the parking link 68 is rotated by the pin 64. When the brake handle 58 is rotated in the direction of the arrow 74, the pin 64 moves into contact with the end 71 of the parking link slot 69. As the handle 58 is rotated further, the parking link 68 pushes on the pivot 66 on the cable link 52, rotating the cable link 52 in the direction of the arrow 73 to engage the brake. The parking link 68 is rotated until the pin 71 moves to or preferably past a line between the pivots 59 and 66, at which point the cable link 68 may abut the housing 51 to prevent further rotation of the parking link 68 or it may abut a stop (not shown) on the handle 58 to limit rotation. In this position, the parking link 68 holds the cable link 52 in the illustrated position wherein the brake remains engaged. Even though the handle 58 is released by the user, the force on the cable 55 cannot rotate the cable link 52 to move the cable link 52 back to the neutral or released position of FIG. 5. If the handle 58 is manually moved so that the pin 64 moves past the line between the pivots 59 and 66 and the handle 58 is released, pulling on the cable 55 will cause the parking link 68 and the cable link 52 to rotate to the neutral position.

It will be appreciated that various modifications and changes may be made to the above described preferred embodiments of a dual mode brake actuator without departing from the scope of the following claims.

We claim:

1. In a dual mode brake actuator for pulling on a brake cable to engage a wheel brake, said brake actuator comprising a housing, a handle mounted in said housing to be moved in a first direction from a first position towards a second position in a first operating mode for progressively engaging the brake and to be moved in a second direction opposite said first direction from said first position to a third position in a second operating mode for maintaining constant brake engagement and a cable link mounted to rotate in said housing, said cable link having a first end adapted to connect to the brake cable to pull the brake cable when said cable link is rotated in one direction and to release the brake cable when said cable link is rotated in an opposite direction, a rotatable parking link arranged in said housing to not interfere with rotation of said cable link when said handle is moved in said first direction between said first and second positions, means on said handle for rotating said parking link when said handle is moved in said second direction from said first position to said third position, and wherein said parking link is arranged to rotate said cable link in said one direction when said handle is moved to said third position.

2. A dual mode brake actuator, as set forth in claim 1, and wherein said cable link has a second end, wherein said first end of said cable link is adapted to connect to the brake cable, and wherein said parking link has a first end mounted to rotate on a parking link pivot on said second end of said cable link.

3. A dual mode brake actuator, as set forth in claim 2, and wherein said cable link is mounted on a cable link pivot on said housing to rotate about a point located between said first and second cable link ends.

4. A dual mode brake actuator, as set forth in claim 3, and wherein said means on said handle for rotating said parking link when said handle is moved from said first position to said third position pushes on said parking link to rotate said cable link when said handle is moved to said third position.

5. A dual mode brake actuator, as set forth in claim 4, wherein said handle is mounted to rotate on a pivot, wherein said parking link includes a slot extending in a direction generally radially from said parking link pivot, wherein said means on said handle for rotating said parking link includes a pin on said handle spaced from said handle pivot and located in said parking link slot and wherein said pin moves in said slot when said handle is moved between said first and second positions.

6. A dual mode brake actuator, as set forth in claim 5, and wherein said dual parking link slot has an end located nearest said parking link pivot, and wherein said pin on said handle pushes against said parking link slot end to rotate said cable link when said handle is moved from said first position to said third position.

7. A dual mode brake actuator, as set forth in claim 6, and further including a braking link mounted to rotate on a braking link pivot on said cable link located between said cable link pivot and said first end of said cable link, and means on said handle for pulling on said braking link to rotate said cable link when said handle is moved from said first position to said second position.

8. A dual mode brake actuator, as set forth in claim 7, and wherein said braking link includes a slot extending in a direction generally radially from said braking link pivot, wherein said means on said handle for pulling on said braking link includes a braking link pin on said handle extending into said braking link slot, and wherein said braking link pin moves in said braking link slot when said handle is moved between said first and third positions.

9. A dual mode brake actuator for pulling on a brake cable to engage a wheel brake said brake actuator including a housing, a handle mounted in said housing to be moved from a first position towards a second position in a first operating mode for progressively engaging the brake and to be moved from said first position to a third position in a second operating mode for maintaining constant brake engagement and a cable link mounted to rotate in said housing, said cable link having a first end adapted to connect to the brake cable to pull the brake cable when said cable link is rotated in one direction and to release the brake cable when said cable link is rotated in an opposite direction, the improvement comprising a rotatable parking link arranged in said housing to not interfere with rotation of said cable link when said handle is moved between said first and second positions, means on said handle for rotating said parking link when said handle is moved from said first position to said third position, and wherein said parking link is arranged to rotate said cable link in said one direction when said handle is moved to said third position, and wherein said parking link has a first end mounted to rotate on a parking link pivot on said housing.

10. A dual mode brake actuator, as set forth in claim 9, and wherein said parking link has a second end which engages and rotates said cable link when said handle is moved from said first position to said third position.

11. A dual mode brake actuator, as set forth in claim 9, wherein said cable link has a second end mounted to rotate on a cable link pivot on said housing, and wherein said handle is mounted to rotate on a handle pivot on said cable link between said first and second ends.

12. A dual mode brake actuator, as set forth in claim 11, and wherein said parking link includes a slot extending in a direction generally radially from said parking link pivot, and wherein said means on said handle for rotating said parking link includes a pin on said handle spaced from said handle pivot and located in said slot.

13. A dual mode brake actuator, as set forth in claim 12, and wherein said parking link slot has an end towards said parking link pivot, and wherein when said handle is moved from said first position to said third position, said pin engages said slot end and pushes said handle to cause said cable link to rotate in said one direction.

14. A dual mode brake actuator, as set forth in claim 13, and wherein when said handle is moved from said first position to said third position, said parking link is rotated past a line extending from said parking link pivot to said handle pivot, and wherein rotation of said parking link is limited by a stop when said handle is moved to said third position.

15. A dual mode brake actuator, as set forth in claim 14, and wherein said handle has an abutment which engages said cable link when said handle is moved from said first position to said second position.

16. A dual mode brake actuator, as set forth in claim 14, and wherein said handle has an abutment which engages said cable link pivot when said handle is moved from said first position to said second position.

* * * * *